United States Patent [19]

Aburaya et al.

[11] Patent Number: 5,043,893
[45] Date of Patent: Aug. 27, 1991

[54] HYDRAULIC ACTIVE SUSPENSION SYSTEM FOR A VEHICLE CAPABLE OF POSITIVELY CONTROLLING THE ATTITUDE OF VEHICLE BODY WHEN HEAVILY LOADED

[75] Inventors: Toshio Aburaya; Shuuichi Buma, both of Toyota; Takashi Yonekawa, Mishima; Kunihito Sato, Susono; Masaki Kawanishi, Toyota; Toshio Onuma; Hiroyuki Ikemoto, both of Susono; Kaoru Ohashi, Okazaki; Toshiaki Hamada, Toyota; Takami Sugiyama, Hazu, all of Japan

[73] Assignees: Aisin Seiki Kabushiki Kaisha; Toyota Jidosha Kabushiki Kaisha, both of Japan

[21] Appl. No.: 459,188

[22] Filed: Dec. 29, 1989

[51] Int. Cl.⁵ .......................................... B60G 17/015
[52] U.S. Cl. ............................. 364/424.05; 280/707
[58] Field of Search ...................... 364/424.05, 424.01; 280/707

[56] References Cited

U.S. PATENT DOCUMENTS

| | | | |
|---|---|---|---|
| 4,803,630 | 2/1989 | Takizawa et al. | 364/424.05 |
| 4,821,191 | 4/1989 | Ikemoto et al. | 364/424.1 |
| 4,897,776 | 1/1990 | Urababa et al. | 364/424.05 |
| 4,903,209 | 2/1990 | Kaneko | 364/424.05 |
| 4,937,748 | 6/1990 | Yonekawa et al. | 364/424.05 |
| 4,967,360 | 10/1990 | Fukunaga et al. | 364/424.05 |

FOREIGN PATENT DOCUMENTS 0223098 5/1987 European Pat. Off. .
60-191806 9/1985 Japan .
60-209314 10/1985 Japan .
8402886 8/1984 World Int. Prop. O. .

OTHER PUBLICATIONS

Active Ride Control-A Logical Step from Static Vehicle Attitude Control, M. B. Packer, Society of Automotive Engineers, Inc. 780050.

Primary Examiner—Thomas G. Black
Attorney, Agent, or Firm—Oliff & Berridge

[57] ABSTRACT

In a hydraulic active suspension system, a plurality of actuators having working fluid chambers are provided corresponding to vehicle wheels. Each actuator is adapted to increase and decrease vehicle height as the results of the supply and the discharge of working fluid to and from its working fluid chamber, respectively. Supplying and discharging devices supply working fluid to and discharge from the working fluid chamber. Vehicle height sensors detect the vehicle heights at the locations corresponding to the vehicle wheels. A control device is further provided. The control device controls the supplying and discharging devices so that the pressure within the working fluid chamber in each actuator may be a value corresponding to the sum of a basic pressure determined according to the running conditions of the vehicle and a compensating pressure determined based upon the integral value of the difference between a standard vehicle height and an actual vehicle height. When the integral value of the difference is larger in magnitude than a predeterminate value, it is reduced in magnitude by the control device so as to prevent the control with the compensating pressure from overriding the control with the basic pressure.

5 Claims, 11 Drawing Sheets

FIG. 6B

STEP 380: CALCULATIONS FOR PID COMPENSATING IN DISPLACEMENT FEEDBACK CONTROLS
$Cxh = KpXh \cdot EXh + KiXh \cdot IXh(n) + KdXh\{EXh(n) - EXh(n-n1)\}$
$Cxp = KpXp \cdot EXp + KiXp \cdot IXp(n) + KdXp\{EXp(n) - EXp(n-n1)\}$
$Cxr = KpXr \cdot EXr + KiXr \cdot IXr(n) + Kdxr\{EXr(n) - EXr(n-n1)\}$
$CxW = KpXW \cdot EXW + KiXW \cdot IXW(n) + KdxW\{EXW(n) - EXW(n-n1)\}$ STEP 390: CALCULATIONS FOR REVERSELY TRANSFERRING DISPLACEMENTS
$PX1 = 1/4 \cdot KX1(CXh - CXp + CXr + CXW)$
$PX2 = 1/4 \cdot KX2(CXh - CXp - CXr - CXW)$
$PX3 = 1/4 \cdot KX3(CXh + CXp + CXr - CXW)$
$PX4 = 1/4 \cdot KX4(CXh + CXp - CXr + CXW)$ STEP 400: PRESSURE COMPENSATING VALUES $Pga$ & $Pgl$ CALCULATE (FIGS. 10 & 11)

STEP 410: CALCULATIONS FOR PD COMPENSATING IN ACCELERATION FEEDBACK CONTROLS
$Cgp = Kpgp \cdot Pga + Kdgp\{Pga(n) - Pga(n-n1)\}$
$Cgr = Kpgr \cdot Pgl + Kdgr\{Pgl(n) - Pgl(n-n1)\}$ STEP 420: CHANGING RATE OF PRESUMED LATERAL ACCELERATION "$\hat{G}l$" CALCULATE (FIG. 12)

STEP 430: CALCULATIONS FOR REVERSELY TRANSFERRING ACCELERATIONS
$Pg_1 = Kg_1/4 \cdot (-Cgp + K2f \cdot Cgr + K1f \cdot \hat{G}l)$
$Pg_2 = Kg_2/4 \cdot (-Cgp - K2f \cdot Cgr - K1f \cdot \hat{G}l)$
$Pg_3 = Kg_3/4 \cdot (Cgp + K2r \cdot Cgr + K1r \cdot \hat{G}l)$
$Pg_4 = Kg_4/4 \cdot (Cgp - K2r \cdot Cgr - K1r \cdot \hat{G}l)$ STEP 440: Hset = Hh? — YES → STEP 480
NO ↓

STEP 450: RXh < RXhl? — NO → STEP 470: $Pbi' \leftarrow Pbi$
YES → STEP 460: $Pbi' \leftarrow Pbi - a$ STEP 480: RXh > RXhh? — NO → STEP 500: $Pbi' \leftarrow Pbi$
YES → STEP 490: $Pbi' \leftarrow Pbi + b$

HYDRAULIC ACTIVE SUSPENSION SYSTEM FOR A VEHICLE CAPABLE OF POSITIVELY CONTROLLING THE ATTITUDE OF VEHICLE BODY WHEN HEAVILY LOADED

BACKGROUND OF THE INVENTION

1. Field of the invention

The present invention relates to a hydraulic active suspension system for a vehicle such as an automobile or the like, and, more particularly, relates to a hydraulic active suspension system which controls both vehicle height and the attitude of a vehicle body.

2. Prior art

As one of the active suspension systems for a vehicle such as an automobile or the like, a hydraulic active suspension system has already been known which comprises a plurality of hydraulic actuators each being provided corresponding to vehicle wheels and adapted to increase and decrease the vehicle height as respective results of the supply and the discharge of working fluid to and from its working fluid chamber, means for supplying working fluid to and discharging it from the working fluid chambers, and control means for controlling the supplying and discharging means in accordance with the running conditions of the vehicle.

As described, for example, in Japanese Patent Laid Open Publication No. 60-500662 (1985), in such a hydraulic active suspension system, it has already been known in the art to control the supplying and discharging means so that the pressure within the working fluid chamber in each actuator may be a value corresponding to the sum of a basic pressure which is determined according to the running conditions of a vehicle and a compensating pressure which is determined based upon the integral value of the difference between a standard vehicle height and an actual vehicle height. According to the hydraulic active suspension system of this type, vehicle height adjustment can be performed in a more stable manner as compared with the system in which the pressure within the working fluid chamber in each actuator is not controlled with a compensating pressure determined according to the integral value of the vehicle height difference.

In such a hydraulic active suspension system as mentioned just above, however, under the condition where the difference between an actual vehicle height and a standard vehicle height is very high due to an extremely high loaded weight, the integral value of the vehicle height difference will inevitably be very high, resulting in too much high compensating value in pressure being determined according to the integral value. Therefore, the control on the pressure within the working fluid chamber in each actuator based upon the compensating value in pressure determined according to the integral value of the vehicle height difference would override the pressure control based upon the basic pressure determined according to the running conditions of the vehicle.

SUMMARY OF THE INVENTION

The present invention takes into consideration the problem associated with the above described hydraulic active suspension system in which the pressure within the working fluid chamber in each actuator is controlled based upon not only a basic pressure determined according to the running conditions of the vehicle but also a compensating pressure determined according to the integral value of the vehicle height difference, and it has as its principal object the provision of a hydraulic active suspension system which is improved to positively control the attitude of a vehicle body even when the loaded weight is extremely high.

It is another object of the present invention to provide such a hydraulic active suspension system as above which can effectively control the rolling and pitching of a vehicle body even while a vehicle runs along a sloping road for a long period of time or the vehicle runs for a long period of time on a road which is inclined transversely to the running direction of the vehicle.

It is yet another object of the present invention to provide such a hydraulic active suspension system as above which can positively adjust the vehicle height to a higher desired height even when a loaded weight is very high.

The above mentioned principal object is accomplished, according to the present invention, by a hydraulic active suspension system for a vehicle having a vehicle body and vehicle wheels comprising:

a plurality of actuators provided between said vehicle body and said associated vehicle wheels and adapted to increase and decrease vehicle heights as the result of the supply and the discharge of working fluid to and from their working fluid chambers, respectively;

means for supplying working fluid to and discharging it from said working fluid chambers;

means for detecting vehicle heights at the locations corresponding to said vehicle wheels; and a control means for controlling said supplying and discharging means so that the pressure within said working fluid chamber in each actuator may be a value corresponding to the sum of a basic pressure determined according to the running conditions of said vehicle and a compensating pressure determined based upon the integral value of the difference between a standard vehicle height and an actual vehicle height;

wherein said control means is adapted to compensate said integral value of the difference to reduce it in magnitude when said integral value is larger in magnitude than a predetermined value.

According to the present invention, the control means is provided which controls the supplying and discharging means so that the pressure within the working fluid chamber in each actuator may be a value corresponding to the sum of a basic pressure determined according to the running conditions of the vehicle and a compensating pressure determined based upon the integral value of the difference between a standard vehicle height and an actual vehicle height, and is adapted to compensate the integral value of the vehicle height difference to reduce it in magnitude when the integral value is larger in magnitude than a predetermined value.

Therefore, since the pressure within the working fluid chambers in each actuator is controlled based upon the reduced integral value of the vehicle height difference under the condition where the difference between an actual vehicle height and a standard vehicle height is very high due to an extremely high loaded weight, the control with the compensating pressure determined according to the integral value of the vehicle height difference would be prevented from overriding the control based upon the basic pressure determined according to the running conditions of the vehicle, which assures an effective control on the attitude of the vehicle body.

The present invention is now described in terms of the preferred embodiment thereof with reference to the attached drawings.

BRIEF DESCRIPTION OF THE DRAWINGS

In the accompanying drawings:

FIGS. 6A through 6C are flow charts showing the subroutine of the calculations for the active control carried out in the step 110 in the flow chart shown in FIG. 3;

DESCRIPTION OF THE PREFERRED EMBODIMENT

Figure 1:
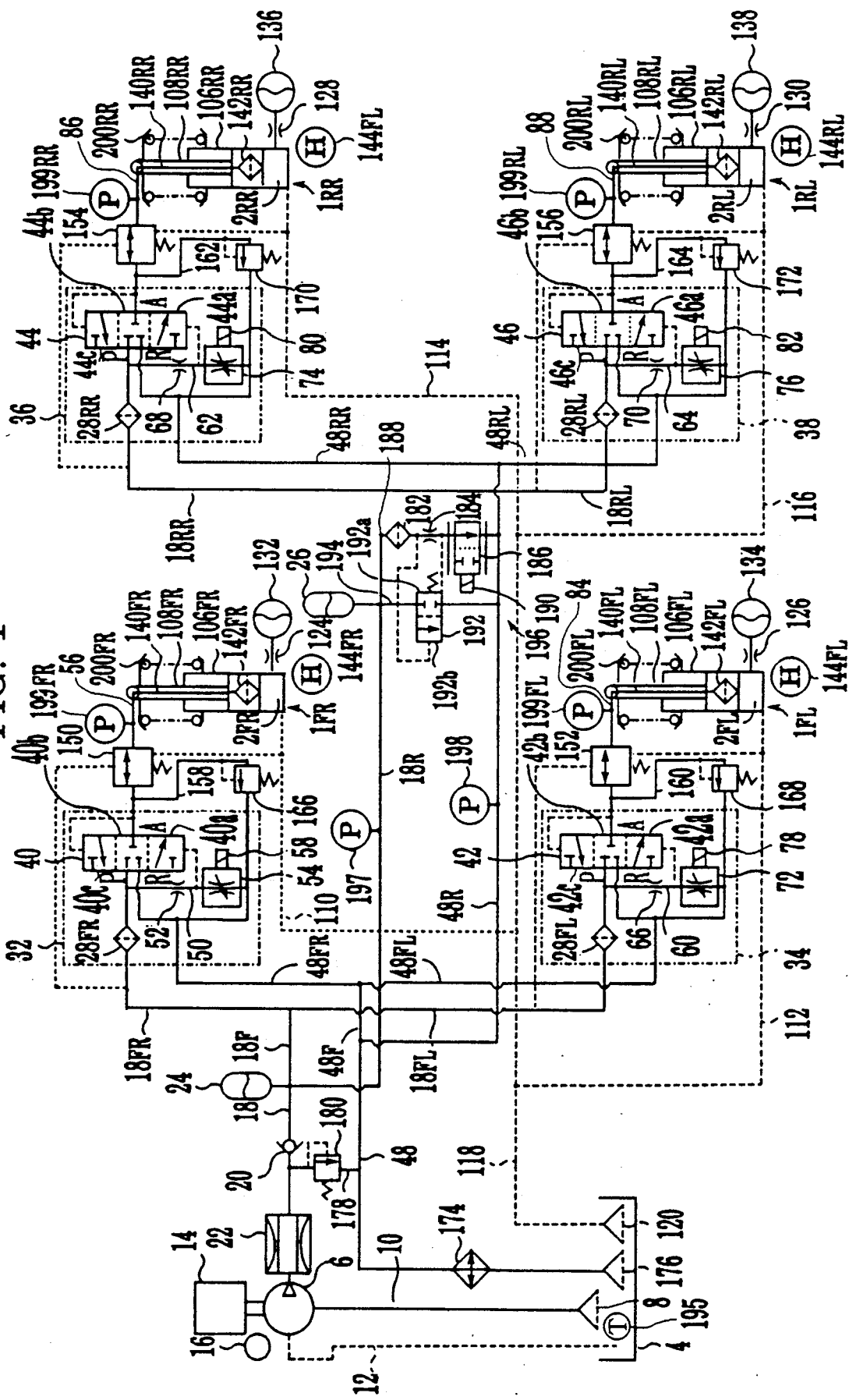
FIG. 1 is a schematic diagram showing major physical components of the preferred embodiment of the hydraulic active suspension system according to the present invention.

Referring to the drawings, FIG. 1 is a schematic diagram showing major physical components of the preferred embodiment of the hydraulic active suspension system of the present invention. The suspension system shown in FIG. 1 includes actuators 1FR, 1FL, 1RR and 1RL provided corresponding to front right, front left, rear right and rear left vehicle wheels, not shown, respectively, and these actuators have therein working fluid chambers 2FR, 2FL, 2RR, and 2RL, respectively.

In the figure, 4 designates a reserve tank which contains oil serving as working fluid, and the tank 4 is fluidly connected to the suction side of a pump 6 by a suction flow line 10 having therein a filter 8 for removing any foreign matter from oil. To the pump 6 is connected a drain line 12 which collects the oil leaking within the pump and returns it to the reserve tank 4. The pump 6 is drivingly connected with and rotationally driven by an engine 14, the rotational speed of which is detected by a rotational speed sensor 16.

A high pressure flow line 18 is connected with the discharge side of the pump 6. A check valve 20 is incorporated in the high pressure flow line 18, which permits only the flow of oil in the direction from the pump towards the actuators, and between the pump 6 and the check valve 20 is provided an attenuator 22 which serves to absorb or dampen the pressure pulsation of the oil discharged from the pump, thereby reducing the pressure variation. The high pressure flow line 18 is connected with one end of each of a high pressure flow line 18F for the front vehicle wheels and a high pressure flow line 18R for the rear vehicle wheels, with which are connected accumulators 24 and 26, respectively. These accumulators contain therein pressurized gas and serve to absorb pressure variation of the oil and to accumulate pressure. A high pressure flow line 18FR for the front right vehicle wheel and a high pressure flow line 18FL for the front left vehicle wheel are connected at their one ends with the high pressure flow line 18F, while a high pressure flow line 18RR for the rear right vehicle wheel and a high pressure flow line 18RL for the rear left vehicle wheel are connected at their one ends with the high pressure flow line 18R. The high pressure flow lines 18FR, 18FL, 18RR and 18RL have therein filters 28FR, 28FL, 28RR and 28RL, respectively, and lines are connected at their other ends with ports P of pilot-operated three-port switching control valves 40, 42, 44 and 46 included in pressure control valves 32, 34, 36 and 38, respectively.

The pressure control valve 32 comprises the switching control valve 40, a flow line 50 fluidly communicating the high pressure flow line 18FR and a low pressure flow line 48FR for the front right vehicle wheel with each other, a fixed flow restriction 52 and a variable flow restriction 54 both provided in the flow line 50. The switching control valve 40 has, in addition to the port P, ports R and A which are connected with low pressure flow line 48FR and a connecting flow line 56, respectively. The switching control valve 40 may be a spool type valve adapted to take in as pilot pressures the pressure Pp within the flow line 50 between the flow restrictions 52 and 54 and the pressure Pa within the connecting flow line 56, and to be shifted to a switching position 40a wherein it fluidly communicates the ports P and A with each other when the pressure Pp is substantially higher than the pressure Pa; a switching position 40b wherein it cuts the communication among the all the ports when the pressure Pp and Pa are substantially equal to each other; and a shifting position 40c wherein it fluidly communicates the ports R and A with each other when the pressure Pp is substantially lower than the pressure Pa. The variable flow restriction 54 is adapted to vary its effective flow area by means of the electric current supplied to its solenoid 58 being controlled and to cooperate with the fixed flow restriction 52 to variably control the pilot pressure Pp.

Similarly, the pressure control valves 34, 36 and 38 comprise pilot-operated, three-port switching control valves 42, 44 and 46 corresponding to the valve 40, flow lines 60, 62 and 64 corresponding to the flow line 50, fixed flow restrictions 66, 68 and 70 corresponding to the flow restriction 52, and variable flow restriction 72, 74 and 76 corresponding to the flow restriction 54, respectively. The variable flow restrictions 72, 74 and 76 have solenoids 78, 80 and 82, respectively, corresponding to the solenoid 58.

The switching control valves 42, 44 and 46 have the same construction as the switching valve 40, and have the ports R connected with one ends of a low pressure flow line 48FL for front left vehicle wheel, a low pressure flow line 48RR for rear right vehicle wheel, and a low pressure flow line 48RL for rear left vehicle wheel, respectively, and the ports A connected with one ends of connecting flow lines 84, 86 and 88, respectively. The switching valves 42, 44 and 46 are spool type valves adapted to take in as pilot pressures the pressures Pp within the associated flow lines 60, 62 and 64 between the associated fixed and the variable flow restrictions and the pressures Pa within the associated flow lines 84, 86 and 88, and to be shifted to switching positions 42a, 44a and 46a, respectively, wherein they fluidly communicate the ports P and A with each other when the pressures Pp are substantially higher than the pressures Pa; shifting positions 42b, 44b and 46b wherein they shut the communications among the all the ports when the pressures Pp and Pa are substantially equal to each other; and shifting positions 42c, 44c and 46c wherein they fluidly communicate the ports R and A with each other when the pressures Pp are substantially lower than the pressures Pa.

As shown schematically in FIG. 1, the actuators 1FR, 1FL, 1RR and 1RL include cylinders 106FR, 106FL, 106RR and 106RL defining the working fluid chambers 2FR, 2FL, 2RR and 2RL and pistons 108FR, 108FL, 108RR and 108RL, respectively, which are reciprocally inserted into the associated cylinders. While in the embodiment shown, the actuators are located between a vehicle body, not shown, and associated suspension arms, also not shown, with each cylinder being coupled to the associated suspension arm and the upper extremity of the rod portion of each piston being coupled to the vehicle body, each cylinder may be coupled to the vehicle body and each piston may be coupled the associated suspension arm. Drain flow lines 110, 112, 114 and 116 are fluidly connected at their one ends with the cylinders 106FR, 106FL, 106RR and 106RL, respectively, of the actuators. The other ends of the drain lines 110, 112, 114 and 116 are connected with a drain flow line 118, which is in turn connected with the reserve tank 4 by way of a filter 120 so that the oil leaking from the working fluid chambers may be returned into the tank.

To the working fluid chambers 2FR, 2FL, 2RR and 2RL are connected accumulators 132, 134, 136 and 138, respectively, serving as hydropneumatic springs by way of flow restrictions 124, 126, 128 and 130, respectively. The pistons 108FR, 108FL, 108RR and 108RL have therein flow lines 140FR, 140FL, 140RR and 140RL, respectively. These flow lines fluidly connect the associated flow lines 56, 84, 86 and 88 and the associated working fluid chambers 2FR, 2FL, 2RR and 2RL with each other, and have therein filters 142FR, 142FL, 142RR and 142RL, respectively. At the locations adjacent to the actuators 1FR, 1FL, 1RR and 1RL are installed vehicle height sensors 144FR, 144FL, 144RR and 144RL, respectively, which detect the vehicle heights at the locations corresponding to the associated vehicle wheels.

The connecting flow lines 56, 84, 86 and 88 have therein pilot-operated cut-off valves 150, 152, 154 and 156, respectively, which are adapted to retain their closed positions whenever the pressure differences between the pressures within the high pressure flow lines 18FR, 18FL, 18RR and 18RL upstream of the associated pressure control valves 40, 42, 44 and 46, respectively, and the pressures within the drain flow lines 110, 112, 114 and 116, respectively, are not more than predetermined values, and to increase their opening degree with the increase in the pressure differences in the range where the differences exceed the predetermined values. The flow lines 56, 84, 86 and 88 are connected between the associated pressure control valves and the cut-off valves with the flow line 50, 60, 62 and 64 in the pressure control valves on the downstream side of the associated variable flow restrictions by flow lines 158, 160, 162 and 164, respectively. The flow lines 158, 160, 162 and 164 have therein relief valves 166, 168, 170 and 172, respectively, which are adapted to take in as pilot pressures the pressures within the associated flow lines 158, 160, 162 and 164, respectively, upstream thereof, i.e., on the side of the associated connecting flow lines, and to open when the pilot pressures exceed predetermined values to thereby conduct some oil within the connecting flow lines to the flow lines 50, 60, 62 and 64.

As will be realized, the cut-off valves 150, 152, 154 and 156 may be adapted to retain their closed positions whenever the differences between the pressures within the high pressure flow lines 18FR, 18FL, 18RR and 18RL and the atmospheric pressure are not more than predetermined values. While in the embodiment shown each cut-off valve is provided between the associated pressure control valve and the associated actuator, it may be incorporated on the opposite side from the actuator relative to the pressure control valve.

The flow lines 48FR and 48FL are connected at their other ends with one end of a low pressure flow line 48F for the front vehicle wheels, while the flow lines 48RR and 48RL are connected at their other ends with one end of a low pressure flow line 48R for the rear vehicle wheels. The flow lines 48F and 48R are connected at their other ends with one end of a low pressure flow line 48. The flow line 48 has therein an oil cooler 174 and is connected at the other end with the reserve tank 4 by way of a filter 176. The high pressure flow line 18 is fluidly connected at a position between the check valve 20 and the attenuator 22 with the low pressure flow line 48 by a flow line 178. The flow line 178 has therein a relief valve 180 which is adapted to open when its pilot pressure is more than a predetermined value.

The high pressure flow line 18R and the low pressure flow line 48R are connected with each other by a flow line 188 which has therein a filter 182, a flow restriction 184 and a normally open electromagnetic on-off valve 186 including a solenoid 190 for adjusting the valve opening. The on-off valve 186 is adapted to close when its solenoid 190 is energized and to control the flow rate of the oil flowing therethrough when the energizing electric current is adjusted. The high pressure flow line 18R and the low pressure flow line 48R are additionally connected with each other by a flow line 194 which have therein a pilot-operated on-off valve 192. The on-off valve 192 is adapted to take in as pilot pressures the pressures on both sides of the flow restriction 184 and to remain in its closed position 192a when no substantial pressure difference exists between the pressures on both sides of the flow restriction 184 and to be switched over to its open position 192b when the pressure on the side of the high pressure flow line 18R relative to the flow restriction 184 is substantially higher than the pressure on the side of the low pressure flow line. Thus, the flow restriction 184, the electromagnetic on-off valve 186 and the on-off valve 192 cooperate with each other to define a bypass valve 196 which selectively communicates the high pressure flow line 18R and the low pressure flow line 48R with each other, and controls the flow rate of the oil flowing from the high pressure flow line to the low pressure flow line.

Further in the embodiment shown, a pressure sensor 197 is connected to the high pressure flow line 18R for detecting the oil pressure Ps within the flow line and similarly a pressure sensor 198 is connected to the low pressure flow line 48R for detecting the oil pressure Pd within the flow line. Pressure sensors 199FR, 199RL, 199RR and 199RL are connected to the connecting flow lines 56, 84, 86 and 88 for detecting the oil pressure within the working fluid chambers 2FR, 2RL, 2RR and 2RL, respectively. A temperature sensor 195 is provided in the reserve tank 4 for detecting the temperature T of the oil within the tank. Compression coil springs 200FR, 200RL, 200RR and 200RL serving as suspension spring are interposed between upper sheets attached to the rod portions of the pistons 108FR, 108RL, 108RR and 108RL incorporated in the actuators and lower sheets secured to the cylinders 106FR, 106RL, 106RR and 106RL, respectively.

Figure 2:
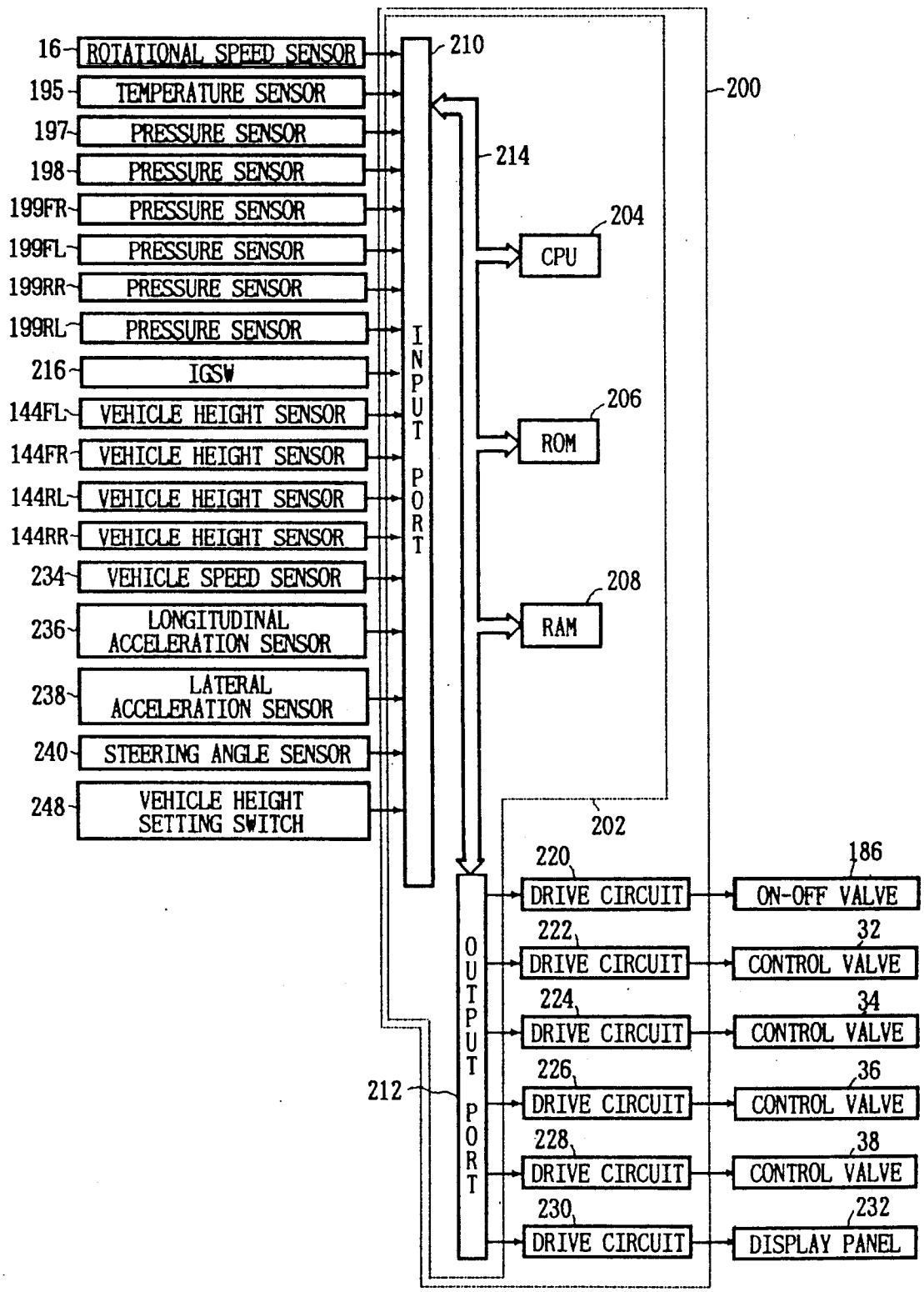
FIG. 2 is a block diagram showing an electric control device of the embodiment shown in FIG. 1.

The electromagnetic on-off valve 186 and the pressure control valves 32, 34, 36 and 38 are controlled by an electric control device 200 shown in FIG. 2. The electric control device 200 includes a microcomputer 202. The microcomputer 202 may, as shown in FIG. 2, be of conventional construction having a (CPU) central processing unit 204, a (ROM) read only memory 206, a (RAM) random access memory 208, an input port device 210, and an output port device 212, all of these being linked with each other by a two way common bus 214.

The input port device 210 is supplied with a signal indicative of the rotational speed N of the engine 14 from the rotational speed sensor 16, a signal indicative of the temperature T of the oil from the temperature sensor 195, signals indicative of the pressures Ps and Pd within the high pressure and the low pressure flow lines from the pressure sensors 197 and 198, respectively, signals indicative of the pressures Pi (where "i" is "1" for the front left wheel, "2" for the front right wheel, "3" for the rear left wheel, and "4" for the rear right wheel) within the working fluid chambers 2FL, 2FR, 2RL and 2RR from the pressure sensors 199FL, 199FR, 199RL and 199RR, respectively, a signal indicative of whether or not an ignition switch (IGSW) 216 is on from the ignition switch, and signals indicative of the vehicle heights Xi (i=1, 2, 3 and 4) at locations corresponding to the front left wheel, the front right wheel, the rear left wheel, and the rear right wheel from the vehicle height sensors 144FL, 144FR, 144RL and 144RR, respectively.

Additionally the input port device 210 is supplied with a signal indicative of a vehicle speed V from a vehicle speed sensor 234, a signal indicative of a longitudinal acceleration Ga from a longitudinal acceleration sensor 236, a signal indicative of a lateral acceleration Gl from a lateral acceleration sensor 238, a signal indicative of a steering angle theta from a steering angle sensor 240, and a signal indicative of whether the mode Hset for controlling the vehicle height set by a vehicle height setting switch 248 is a high mode Hh or a normal mode Hn. The switch 248 is provided in the cabin to be operated by a driver or a passenger according to his or her taste.

The input port device 210 processes the signals input thereinto in a predetermined manner and, under the control of the CPU 204 and based upon the program stored in the ROM 206, outputs the processed signals to the CPU and the RAM 208. The ROM 206 stores the control flows shown in FIG. 3 and FIGS. 6A through 6C and the maps shown in FIGS. 4 and 5 and FIGS. 7 through 13. The output port device 212, under the control of the CPU 204, outputs a control signal via a drive circuit 220 to the electromagnetic on-off valve 186 and control signals via drive circuits 222, 224, 226 and 228 to the pressure control valves 32, 34, 36 and 38, to be more exact, to the solenoids 58, 78, 80 and 82 in the variable flow restrictions 54, 72, 74 and 76, respectively, and a control signal via a drive circuit 230 to a display panel 232.

Figure 3:
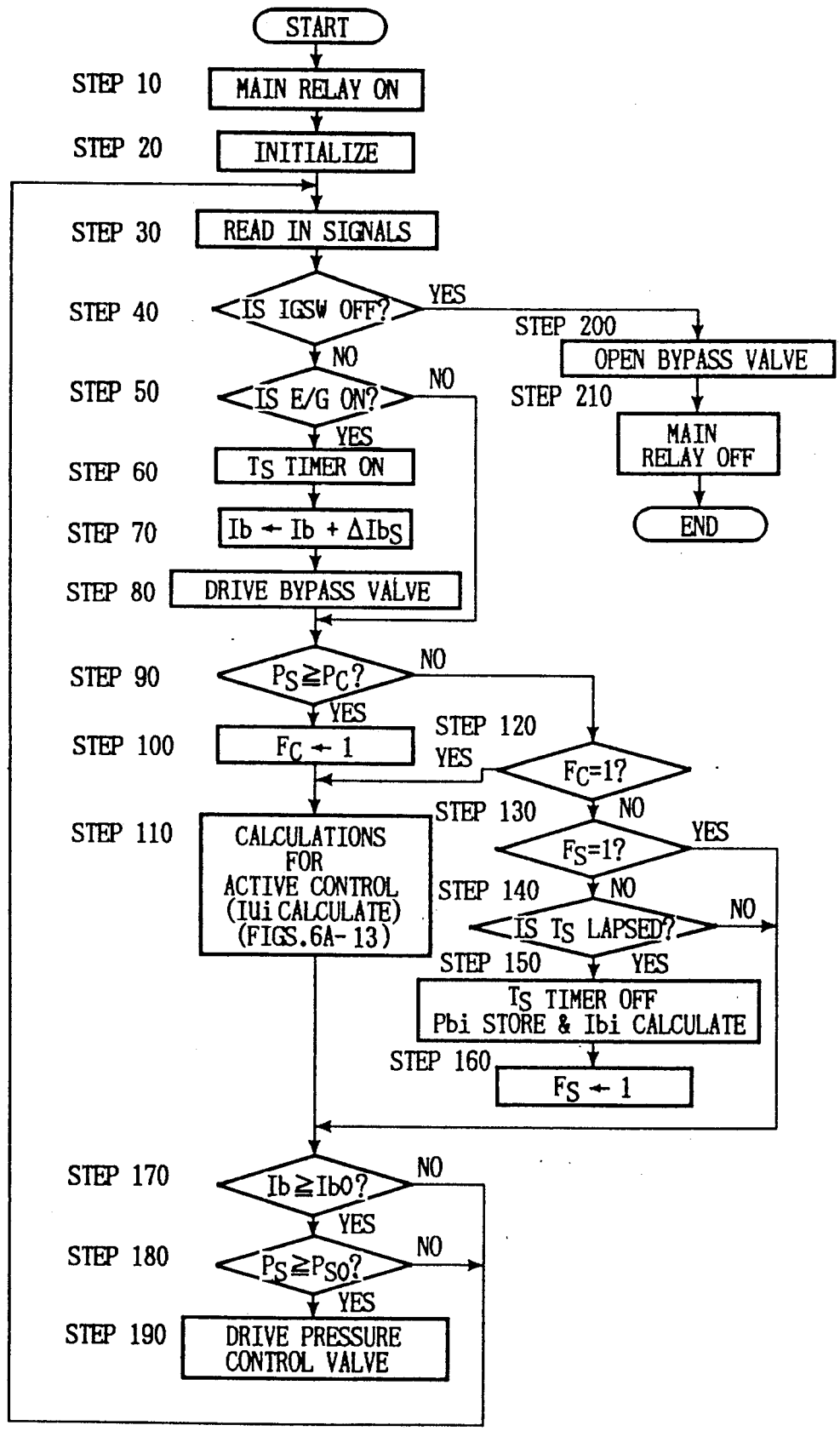
FIG. 3 is a flow chart showing a control flow of a cyclical program carried out by the electric control device shown in FIG. 2.

Referring now to the flow chart shown in FIG. 3, the operation of the embodiment is explained.

In this connection, it is to be noted that the routine of the control flow shown in FIG. 3 is initiated when the ignition switch 216 is turned on. It should also be noted that in the flow chart shown in FIG. 3, a flag Fc relates to whether or not the pressure Ps of the oil within the high pressure flow line has ever exceeded a threshold pressure Pc above which the cut-off valves 152, 150, 156 and 154 are completely opened with one meaning the pressure Ps has exceeded the pressure Pc, and a flag Fs is related to whether or not standby pressures Pbi (i=1, 2, 3 and 4) referred to later have been set for the pressure control valves 34, 32, 38 and 36, with one meaning the standby pressures have been set.

In the first step 10, a main relay not shown in the figures is turned on, and then the flow of control passes next to the step 20.

In the step 20, the RAM 208 is cleared of all the information stored therein and all the flags are reset to zero, and then the flow of control passes to the next step 30.

In the step 30, are read in the signal indicative of the rotational speed N of the engine 14 detected by the rotational speed sensor 16, the signal indicative of the temperature T of the oil detected by the temperature sensor 195, signals indicative of the pressures Ps and Pd within the high pressure and the low pressure flow line detected by the pressure sensors 197 and 198, respectively, the signals indicative of the pressures Pi within the working fluid chambers 2FL, 2FR, 2RL and 2RR detected by the pressure sensors 199FL, 199FR, 199RL and 199RR, the signal indicative of whether or not the ignition switch 216 is on, the signals indicative of the vehicle heights Xi detected by the vehicle height sensors 144FL, 144FR, 144RL and 144RR, the signal indicative of the vehicle speed V detected by the speed sensor 234, the signal indicative of the longitudinal acceleration Ga detected by the longitudinal acceleration sensor 236, the signal indicative of the lateral acceleration Gl detected by the lateral acceleration sensor 238, the signal indicative of the steering angle theta detected by the steering angle sensor 240, and the signal indicative of whether the mode for controlling the vehicle height set by the vehicle height setting switch 248 is the high mode or the normal mode, and then the flow of control passes next to the step 40.

In the step 40, a decision is made as to whether or not the ignition switch is off. If a decision is made that the ignition switch is off, then the flow of control is transferred to the step 200, and if a decision is made that the ignition switch is on, then the flow of control passes next to the step 50.

In the step 50, a decision is made as to whether or not the engine is running by determining whether or not the rotational speed N of the engine which was detected by the rotational speed sensor 16 and read in in the step 30 is more than a predetermined value. If a decision is made that the engine is not running, then the flow of control is transferred to the step 90, and if a decision is made that the engine is running, then the flow of control passes next to the step 60.

It is to be understood that the decision as to whether or not the engine is running may be made by, for example, determining whether or not the voltage of the electricity generated by an alternator, not shown, which is driven by the engine is higher than a predetermined value.

In the step 60, a timer is started which counts the period of time Ts between the time point when the engine is started and the time point when the standby pressures Pbi are set for the pressure control valves 34, 32, 38 and 36 in the step 150 referred to later, and then the flow of control passes next to the step 70. In the event, however, where the timer has already been operated, it continues to count.

Figure 4:
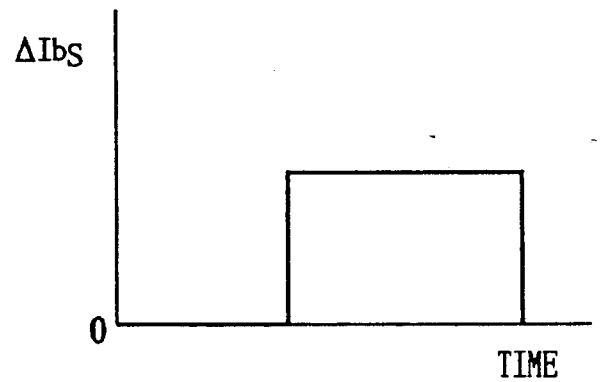
FIG. 4 is a graph showing the map utilized in calculating the electric current Ib which is supplied to the bypass valve at the stage when the active suspension system is started.
Figure 5:
FIG. 5 is a graph showing the relationship between the pressures Pi within the working fluid chambers in the actuators and the electric currents Ibi Iui supplied to the pressure control valves.
Figure 6A:
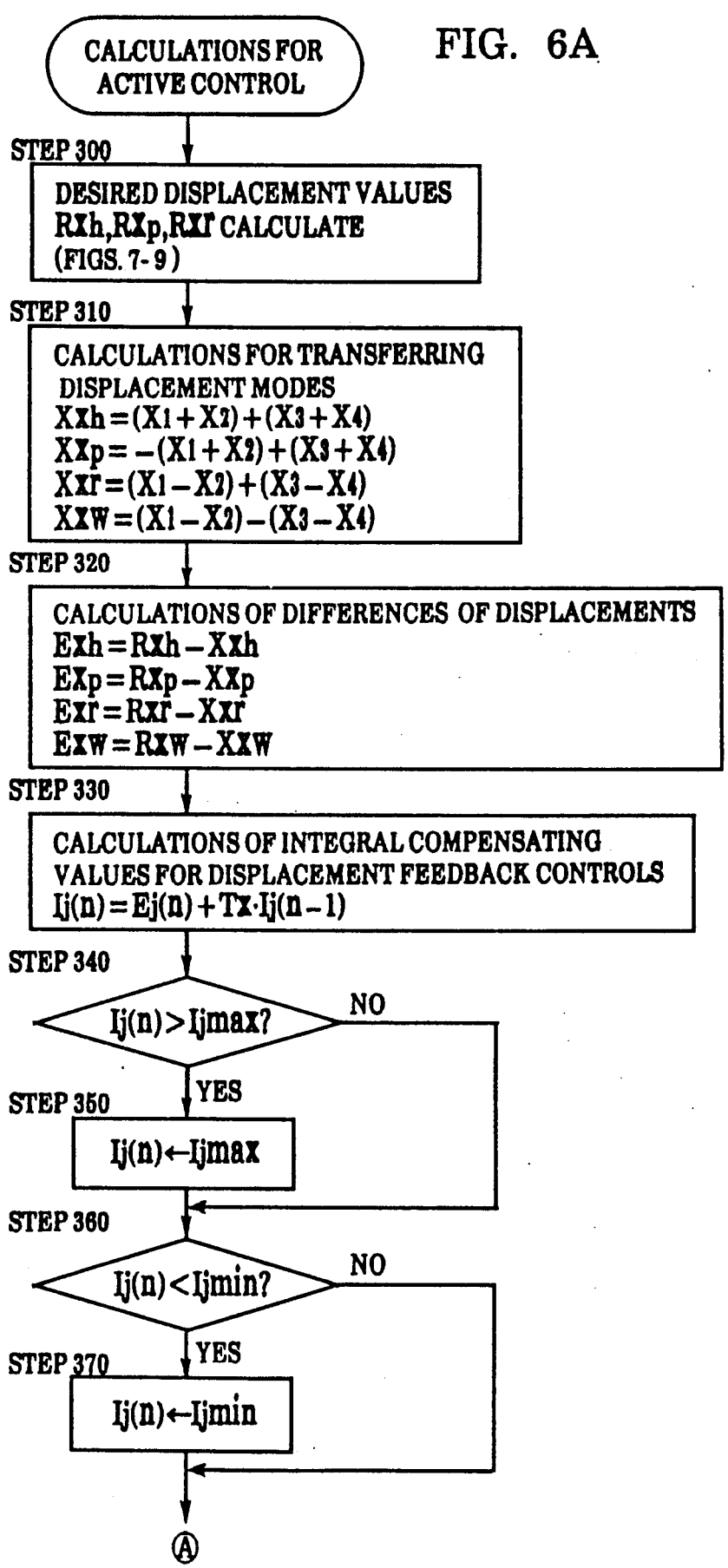
Figure 6C:
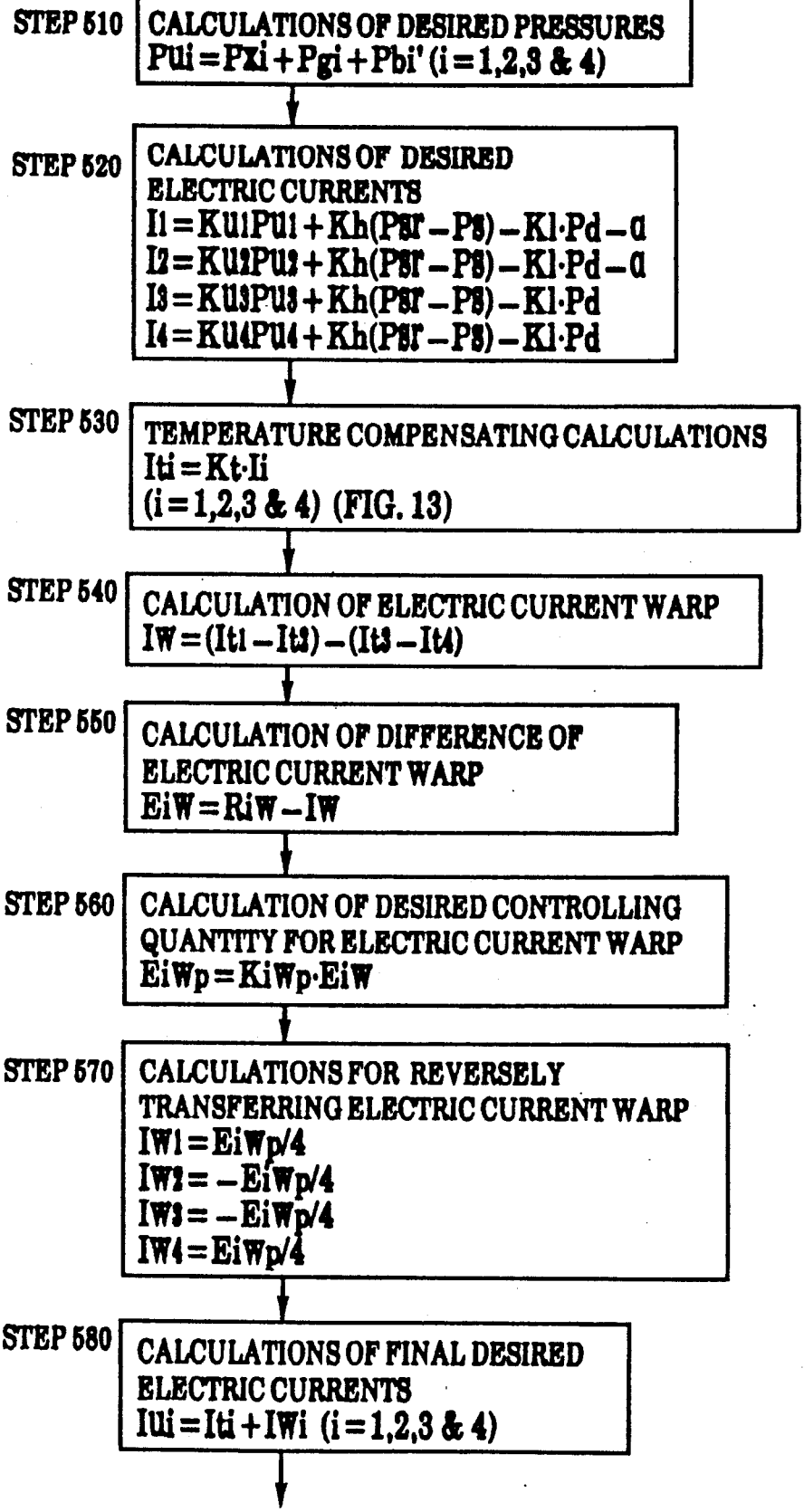

In the step 70, electric current Ib which is supplied to the solenoid 190 within the electromagnetic on-off valve 186 included in the bypass valve 196 is calculated based upon the map stored in ROM 206, which corresponds to the graph shown in FIG. 4, according to the following equation, and then the flow of control passes next to the step 80.

Ib=Ib+delta Ibs

In the step 80, the electric current Ib calculated in the step 70 is supplied to the solenoid 190 in the electromagnetic on-off valve 186 to shift the bypass valve 196 toward its fully closed position, and then the flow of control proceeds to the next step 90.

In the step 90, a decision is made as to whether or not the pressure Ps within the high pressure flow line is equal to or more than the threshold value Pc. If a decision is made that Ps is not equal to or is not higher than Pc, then the flow of control is transferred to the step 120, and if a decision is made that Ps is equal to or higher than Pc, then the flow of control passes next to the step 100.

In the step 100, the flag Fc is set to one, and next the flow of control passes to the step 110.

In the step 110, as will be described in detail referring to FIGS. 6A through 6C and FIGS. 7 through 13, in order to control the comfortability of the vehicle and the attitude of the vehicle body, the calculations for the active control are performed based upon the data read in in the step 30 to calculate the electric currents Iui supplied to the solenoid 78, 58, 82 and 80 incorporated in the variable flow restrictions 72, 54, 76 and 74 in the pressure control valves, and then the flow of control proceeds to the next step 170.

In the step 120, a decision is made as to whether or not the flag Fc is one. If a decision is made that the flag Fc is one, i.e., the pressure Ps of the oil within the high pressure flow line has been decreased to a level lower than the threshold pressure Pc after it was increased to a level equal to or higher than the threshold value, then the flow of control passes to the step 110, and if a decision is made that the flag Fc is not one, i.e., the pressure Ps has not yet been increased to a level equal to or higher than the threshold pressure Pc, then the flow of In the step 130, a decision is made as to whether or not the flag Fs is one. If a decision is made that the flag Fs is one, then the flow of control passes to the step 170, and if a decision is made that the flag Fs is not one, then the flow of control passes next to the step 140.

In the step 140, a decision is made as to whether or not the time Ts has elapsed. If a decision is made that the time Ts has not yet elapsed, then the flow of control passes to the step 170, and if a decision is made that the time Ts has elapsed, then the flow of control passes next to the step 150.

In the step 150, the Ts timer is stopped, and the values of the electric currents Ibi (i=1, 2, 3 and 4) are calculated which are supplied to the solenoids 78, 58, 82 and 80 incorporated within the variable flow restrictions 72, 54, 76 and 74 in the pressure control valves 34, 32, 38 and 36 so that the pressures within the connecting flow lines 84, 56, 88 and 86 between the associated pressure control valves and the associated cut-off valves may be controlled to the respective standby pressures Pbi, i.e., the pressures which are substantially equal to the pressures Pi within the working fluid chambers 2FL, 2FR, 2RL and 2RR that are detected by the associated pressure sensors, and then the flow of control passes next to the step 160.

In the step 160, the flag Fs is set to one, and then the flow of control is transferred to the step 170.

In the step 170, a decision is made as to whether or not the electric current Ib calculated in the step 70 is not less than a reference value Ibo. If a decision is made that the current Ib is less than Ibo, then the flow of control is returned to the step 30, and if a decision is made that the current Ib is not less than or equal to Ibo, then the flow of control passes next to the step 180.

In the step 180, a decision is made as to whether or not the pressure Ps within the high pressure flow line read in in the step 30 is not less than a reference value Pso which is lower than the threshold value Pc. If a decision is made that Ps is less than Pso, then the flow of control is returned to the step 30, and if a decision is made that Ps is not less than or equal to Pso, then the flow of control passes next to the step 190.

In the step 190, the electric currents Ibi calculated in the step 150 or the electric currents Iui calculated in the step 110 are supplied to the solenoid 78, 58, 82 and 80 incorporated in the variable flow restrictions included in the associated pressure control valves so that the valves are driven to adjust the pressures within the working fluid chambers in the associated actuators, and then the flow of control is returned to the step 30, the steps 30 through 190 being repeated.

In the step 200, the supply of the electric current to the solenoid 190 in the electromagnetic on-off valve 186 is stopped to open the bypass valve 196, and then the flow of control passes next to the step 210.

In the step 210, the main relay is turned off to finish the control flow shown in FIG. 3 and to stop supplying electricity to the electric control device 200 shown in FIG. 2.

It is to be noted that the pressure control conducted by the bypass valve when the system is started does not form a principal part of the present invention, and reference may be made for the details concerning the pressure control to the Japanese Patent Application No. Showa 63-307189 which was filed by an applicant the same as one of the assignees of the present application. It is also to be understood that the pressure control conducted by the bypass valve when the system is stopped may be carried out in the same manner as in the system described in the Japanese Patent Application Showa 63-307190 which was also filed by an applicant the same as one of the assignees of the present application.

Referring next to the FIGS. 6A through 6C and FIGS. 7 through 13, the calculations for the active control conducted in the above-mentioned step 110 will be explained.

Figure 7:
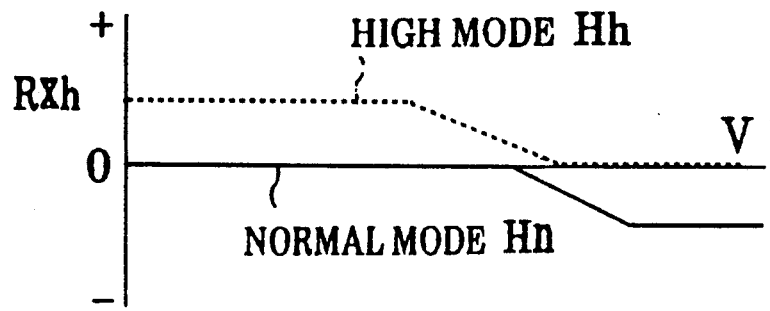
FIG. 7 is a graph showing the relationship between a vehicle speed V and a desired displacement Rxh of heave.
Figure 8:
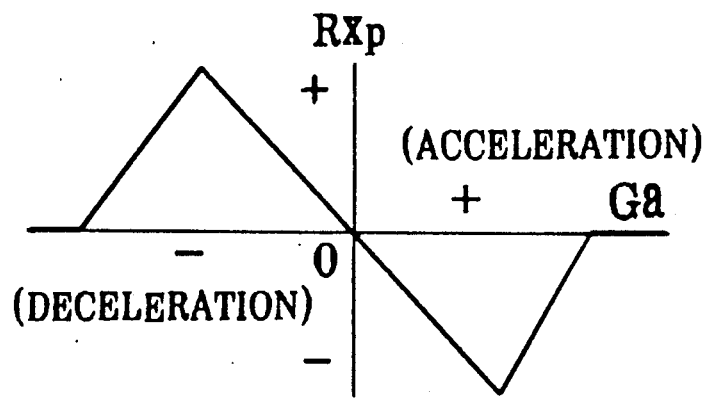
FIG. 8 is a graph showing the relationship between a longitudinal acceleration Ga and a desired displacement Rxp of pitch.
Figure 9:
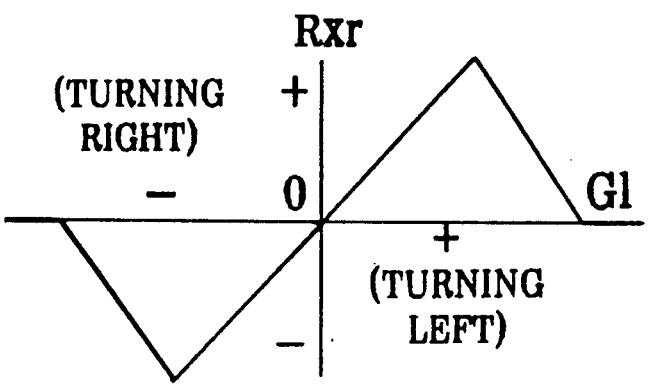
FIG. 9 is a graph showing the relationship between a lateral acceleration Gl and a desired displacement Rxr of roll.

In the step 300, based upon the maps corresponding to the graphs shown in FIGS. 7 through 9, desired displacement values Rxh, Rxp and Rxr of heave, pitch and roll, respectively, for attaining a desired attitude of the vehicle body are calculated, and then the flow of control passes next to the step 310.

It is to be noted that in FIG. 7, the solid line shows a pattern wherein the mode Hset for controlling vehicle heights set by the vehicle height setting switch is the normal mode Hn and the dotted line shows a pattern wherein the mode is the high mode Hh.

In the step 310, based upon the vehicle heights $X_1$, $X_2$, $X_3$ and $X_4$ at the locations corresponding to the front left, front right, rear left, and rear right vehicle wheels read in in the step 30, calculations for transferring the displacements into values of heave "Xxh", pitch "Xxp", roll "Xxr" and warp "Xxw" are carried out according to the following equations, and thereafter the flow of control passes next to the step 320.

$$Xxh = (X_1 + X_2) + (X_3 + X_4)$$

$$Xxp = -(X_1 + X_2) + (X_3 + X_4)$$

$$Xxr = (X_1 - X_2) + (X_3 - X_4)$$

$$Xxw = (X_1 - X_2) - (X_3 - X_4)$$

In the step 320, the differences of the displacements of the respective modes are calculated according to the following equations, and next the flow of control passes to the step 330.

$$Exh = Rxh - Xxh$$

$$Exp = Rxp - Xxp$$

$$Exr = Rxr - Xxr$$

$$Exw = Rxw - Xxw$$

In this connection, Rxw may be zero, or Xxw calculated in the step 410 just after the active suspension system has been started to operate or the average value of Xxws calculated in the last few cycles. If the absolute value of Exw is equal to or less than W1 which is a positive constant, Exw is then set to zero.

In the step 330, letting EJ(n) (J=xh, xp, xr and xw) denote the present values of EJ, and IJ(n) and IJ(n−1) represent values of Ij of the present cycle and one cycle before, respectively, integral compensating values for the displacement feedback controls are calculated according to the following equations, and then the flow of control passes next to the step 340.

$$Ij(n) = Ej(n) + Tx \cdot Ij(n-1)$$

In the step 340, decisions are made as to whether or not the integral compensating values Ij(n) are higher than respective positive reference values Ijmax. If decisions are made that the compensating values Ij(n) are not higher than Ijmax, then the flow of control is transferred to the step 360, and if decisions are made that the compensating values Ij(n) are higher than Ijmax, then the flow of control passes next to the step 350.

In the step 350, the integral compensating values IJ(n) are set to Ijmax, and then the flow of control proceeds to the next step 360.

In the step 360, decisions are made as to whether or not the integral compensating values Ij(n) are lower than respective negative reference values Ijmin. If decisions are made that the compensating values Ij(n) are not lower than Ijmin, then the flow of control is transferred to the step 380, and if decisions are made that the compensating values Ij(n) are lower than Ijmin, then the flow of control passes next to the step 370.

In the step 370, the integral compensating values Ij(n) are set to IJmin, and then the flow of control proceeds to the next step 380.

It is to be understood that although the steps 340 through 370 are collectively expressed for the modes of heave, pitch, roll and warp, these steps are actually carried out individually for the respective modes.

In the step 380, calculations for PID compensations in displacement feedback controls are conducted according to the following equations, and thereafter the flow of control passes next to the step 390.

$$Cxh = Kpxh \cdot Exh + Kixh \cdot Ixh(n) + Kdxh \{Exh(n) - Exh(n-n1)\}$$

$$Cxp = Kpxp \cdot Exp + Kixp \cdot Ixp(n) + Kdxp \{iExp(n) - Exp(n-n1)\}$$

$$Cxr = Kpxr \cdot Exr + Kixr \cdot Ixr(n) + Kdxr \{Exr(n) - Exr(n-n1)\}$$

$$Cxw = Kpxw \cdot Exw + Kixw \cdot Ixw(n) + Kdxw \{Exw(n) - Exw(n-n1)\}$$

It should be noted that in the above equations, Ej(n) (j=xh, xp, xr and xw) are the present values of EJ, and Ej(n−n1) are values of Ej obtained n1 cycles before. The coefficients Kpj, Kij and Kdj (j=xh, xp, xr and xw) are proportional constants, integral constants and differential constants, respectively.

In the step 390, calculations for reversely transferring the displacement modes are carried out according to the following equations, and then the flow of control proceeds to the step 400.

$$Px1 = \tfrac{1}{4} \cdot Kx1(C1xh - Cxp + Cxr + Cxw)$$

$$Px2 = \tfrac{1}{4} \cdot Kx2(Cxh - Cxp - Cxr - Cxw)$$

$$Px3 = \tfrac{1}{4} \cdot Kx3(Cxh + Cxp + Cxr - Cxw)$$

$$Px4 = \tfrac{1}{4} \cdot Kx4(Cxh + Cxp - Cxr + Cxw)$$

where Kx1, Kx2, Kx3 and Kx4 are proportional constants.

Figure 10:
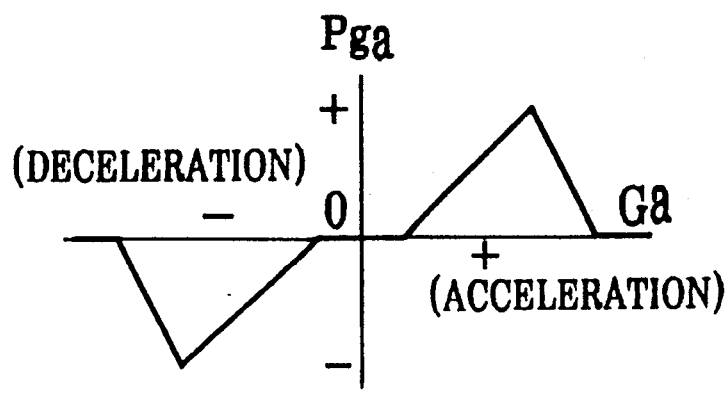
FIG. 10 is a graph showing the relationship between a longitudinal acceleration Ga and a pressure compensating value Pga.
Figure 11:
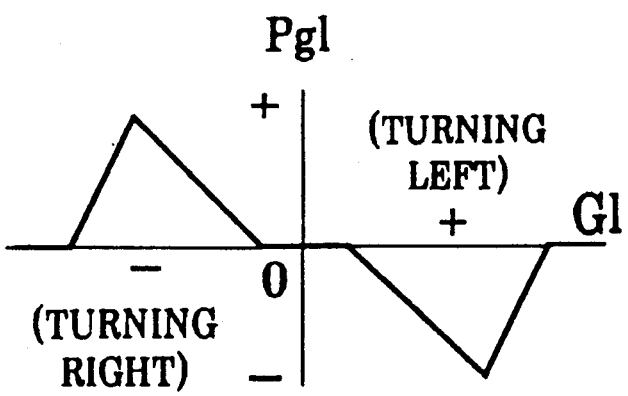
FIG. 11 is a graph showing the relationship between a lateral acceleration Gl and a pressure compensating value Pgl.

In the step 400, based upon the maps corresponding to the graphs shown in FIGS. 10 and 11, pressure compensating values Pga and Pgl in the longitudinal and lateral directions, respectively, are calculated, and then the flow of control passes next to the step 410.

In the step 410, calculations for PD compensations on pitch (Cgp) and roll (Cgr) in acceleration feedback control are conducted according to the following equations, and thereafter the flow of control proceeds to the next step 420.

$$Cgp = Kpgp \cdot Pga + Kdgp\{Pga(n) - Pga(n-n1)\}$$

$$Cgr = Kpgr \cdot Pgl + Kdgri\{Pgl(n) - Pgl(n-n1)\}$$

It is to be noted that Pga(n) and Pgl(n) are present Pga and Pgl, respectively, and Pga(n−n1) and Pgl(n−n1) are Pga and Pgl, respectively, at the cycle which is n1 cycles before. Kpgp and Kpgr are proportional constants, while Kdgp and Kdgr are differential constants.

Figure 12:
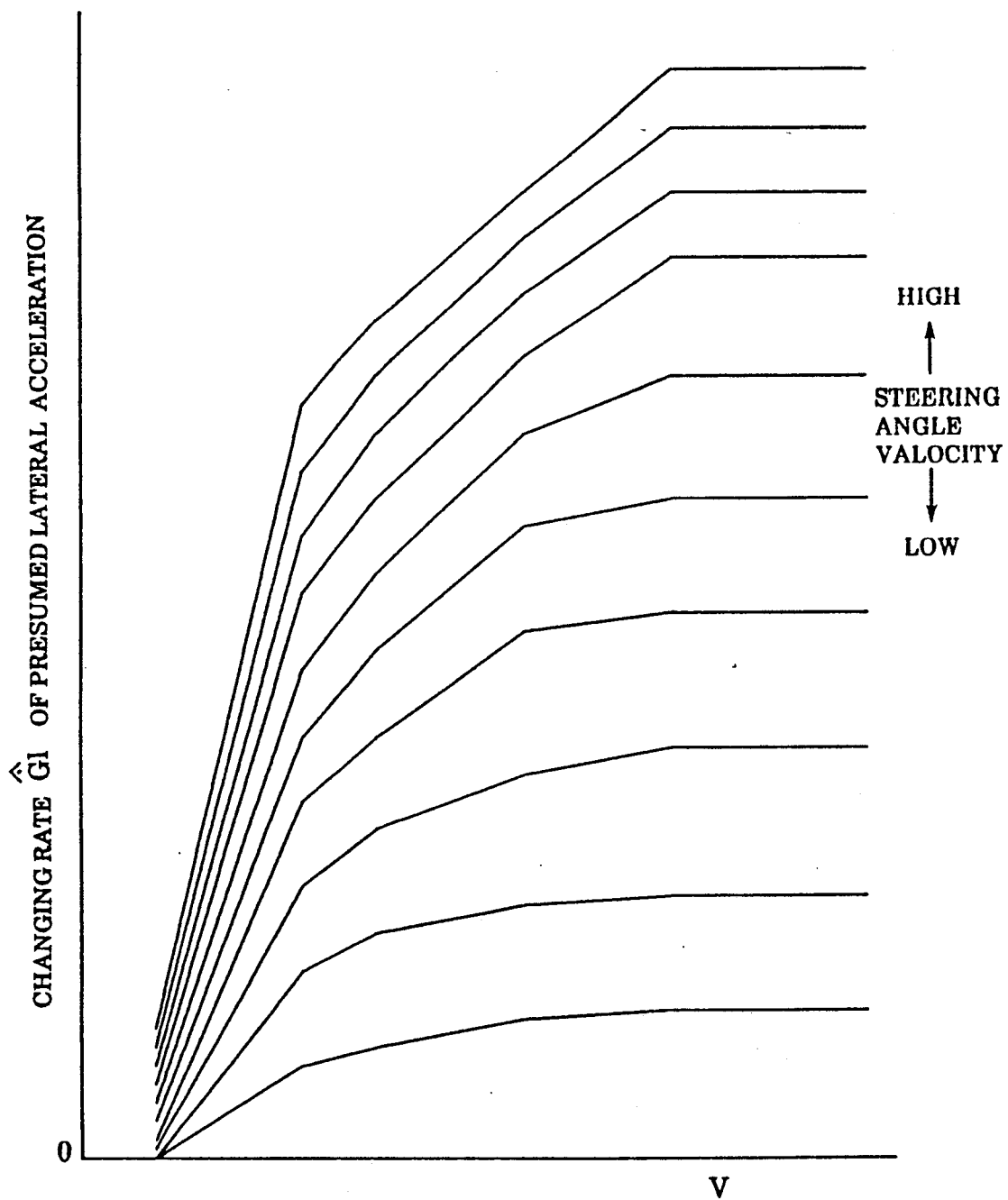
FIG. 12 is a graph showing the relationship between a vehicle speed V, a steering angle velocity and the changing rate Gl of a presumed lateral acceleration.

In the step 420, letting theta' represent a steering angle read in in the step 30 one cycle before in the flow chart shown in FIG. 3, steering angle velocity delta theta is calculated according to the following equation:

$$\text{delta theta} = \text{theta} - \text{theta}'$$

and based upon the map corresponding to the graph shown in FIG. 12 and from the steering angle velocity calculated above and a vehicle speed V. the changing rate of the presumed lateral acceleration "Gl" is calculated, and thereafter the flow of control passes next to the step 430.

In the step 430, calculations for reversely transferring acceleration modes are performed according to the following equations, and next the flow of control proceeds to the step 440.

$$Pg1 = Kg1/4 \cdot (-Cgp + K2f \cdot Cgr + K1f \cdot \hat{Gl})$$

$$Pg2 = Kg2/4 \cdot (-Cgp - K2f \cdot Cgr - K1f \cdot \hat{Gl})$$

$$Pg3 = Kg3/4 \cdot (Cgp + K2r \cdot Cgr + K1r \cdot \hat{Gl})$$

$$Pg2 = Kg4/4 \cdot (Cgp - K2r \cdot Cgr - K1r \cdot \hat{Gl})$$

In the equations Kg1, Kg2, Kg3 and Kg4 are proportional constants, and K1f, K1r, K2f and K2r are constants serving as distributing gains between front and rear vehicle wheels.

In the step 440, a decision is made as to whether or not the vehicle height controlling mode Hset set by vehicle height setting switch is the high mode Hh. If a decision is made that the controlling mode Hset is the high mode Hh, then the flow of control is transferred to the step 480, and if a decision is made that the controlling mode is not the high mode, then the flow of control passes next to the step 450.

In the step 450, a decision is made as to whether or not the desired value Rxh of heave calculated in the step 300 is lower than a reference value Rxhl. If a decision is made that the desired value Rxh is not lower than the reference value Rxhl, then the flow of control is transferred to the step 470, and if a decision is made that the desired value is lower than the reference value, then the flow of control passes next to the step 460.

In the step 460, letting "a" denote a positive compensating constant, the standby pressures are compensated to be reduced according to the following equations, and then the flow of control proceeds to the step 500.

$$Pbi' = Pbi - a$$

In the step 470, the standby pressures Pbi' are set to the pressures Pbi calculated in the step 150, and thereafter the flow of control is transferred to the step 510.

In the step 480, a decision is made as to whether or not the desired value Rxh of heave is higher than a reference value Rxhh. If a decision is made that the desired value Rxh is not higher than the reference value Rxhh, then the flow of control is transferred to the step 500, and if a decision is made that the desired value is higher than the reference value, then the flow of control passes next to the step 490.

In the step 490, letting "b" denote a positive compensating constant, the standby pressures are compensated to be increased according to the following equations, and then the flow of control proceeds to the step 510.

$$Pbi' = Pbi + b$$

In the step 500, the standby pressures Pbi' are set to the pressures Pbi calculated in the step 150, and thereafter the flow of control is transferred to the step 510.

In the step 510. based upon the pressures Pbi' set in the steps 460, 470, 490 and 500 and the calculated values obtained in the steps 390 and 430, desired controlling pressures Pui of the pressure control valves are calculated according to the following equations, and thereafter the flow of control proceeds to the step 520.

$$Pui = Pxi + Pgi + Pbi' \ (i = 1, 2, 3 \text{ and } 4)$$

In the step 520, desired electric currents supplied to the pressure control valves are calculated according to the following equations, and then the flow of control passes next to the step 530.

$$I1 = Ku1 \cdot Pu1 + Kh(Psr - Ps) - Kl \cdot Pd - \text{alpha}$$

$$I2 = Ku2 \cdot Pu2 + Kh(Psr - Ps) - Kl \cdot Pd - \text{alpha}$$

$$I3 = Ku3 \cdot Pu3 + Kh(Psr - Ps) - Kl \cdot Pd$$

$$I4 = Ku4 \cdot Pu4 + Kh(Psr - Ps) - Kl \cdot Pd$$

It is to be noted that Ku1, Ku2, Ku3, Ku4 are proportional constants for corresponding vehicle wheels; Kh and Kl are compensating coefficients for pressures within the high pressure and the low pressure flow lines, respectively; alpha is a compensating constant between the front and rear vehicle wheels; and Psr is a standard pressure within the high pressure flow line.

Figure 13:
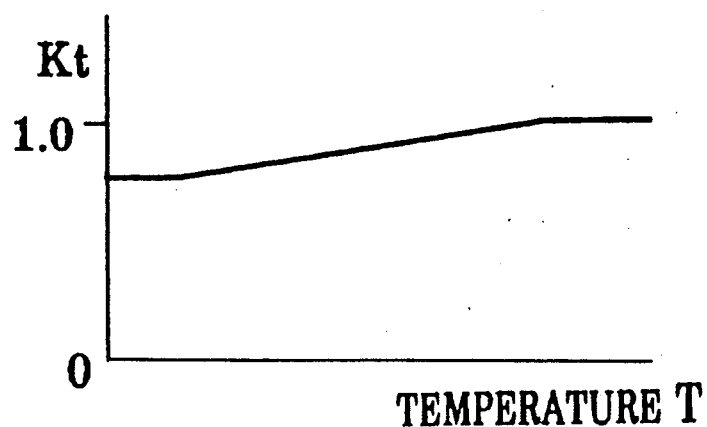
FIG. 13 is a graph showing the relationship between the temperature T of oil and a compensating coefficient Kt.

In the step 530, based upon the temperature T of the oil read in in the step 30 and the map corresponding to the graph shown in FIG. 13. a coefficient Kt for compensating for temperature is calculated; the calculations for compensating the desired electric currents for temperature are effected according to the following equations; and then the flow of control passes next to the step 540.

$$Iti = Kt \cdot Ii \ (i = 1, 2, 3 \text{ and } 4)$$

In the step 540, an electric current warp, i.e., a warp of the electric current values about the longitudinal axis of the vehicle body, is calculated according to the following equation, and thereafter the flow of control proceeds to the step 550.

$$Iw = (It1 - It2) - (It3 - It4)$$

In the step 550, letting Riw denote a desired electric current warp, a difference of the electric current warp is calculated according to the following equation, and next the flow of control proceeds to the step 560.

$$Eiw = Riw - Iw$$

In the above equation the desired electric current warp Riw may be zero.

In the step 560, letting Kiwp represent a proportional constant, a desired controlling value of the electric current warp is calculated according to the following equation, and then the flow of control passes to the next step 570.

$$Eiwp = Kiwp \cdot Eiw$$

In the step 570, calculations for reversely transferring the electric current warp are carried out according to the following equations, and thereafter the flow of control is transferred to the next step 580.

$$Iw1 = Eiwp/4$$

$$Iw2 = -Eiwp/4$$

$$Iw3 = -Eiwp/4$$

$$Iw4 = Eiwp/4$$

In the step 580, based upon the values obtained by the calculations conducted in the steps 530 and 570, final desired electric currents Iui supplied to the pressure control valves are calculated according to the following equations, and then the flow of control is transferred to the step 170 shown in FIG. 3.

$$Iui = Iti + Iwi \; (i = 1, 2, 3 \text{ and } 4)$$

Thus, in the embodiment so far described, in the step 330 the integral compensating values Ij(n) are calculated which are used in the displacement feedback controls; in the steps 340 through 370 if the integral compensating values are higher or less than the respective predetermined values, they are compensated to be the predetermined values Ijmax or Ijmin, respectively; and thereafter in the step 380 the PID compensating calculations for the displacement feedback controls are carried out.

Therefore, in the case where the loaded weight of the vehicle is very high and, as a result, the differences between the actual vehicle heights and the respective standard vehicle heights are also very high, the integral compensating value Ixh of heave is reduced in magnitude so that although the vehicle heights could not be controlled to desired values, the undesired attitude change of the vehicle body such as rolling or pitching can effectively be controlled.

In the embodiment also, since the displacement of the vehicle body is resolved into the four modes of heave, pitch, roll and warp and the integral compensating values for the respective modes are compensated as required, the rolling and the pitching of the vehicle body can effectively be controlled even under the conditions where the vehicle runs along a sloping road for a longer period of time or the vehicle runs for a longer period of time on a road which is inclined transversely to the running direction of the vehicle.

Furthermore, according to the embodiment, since the stand-by pressures Pbi are compensated to increase or decrease in accordance with the desired vehicle heights in the steps 440 through 500, the situation where the vehicle heights are not effectively adjusted to higher, desired values can be prevented from occurring which might otherwise occur due to the lowered range of vehicle adjustment that results from the integral compensating value of heave being reduced in magnitude as above.

Figure 14:
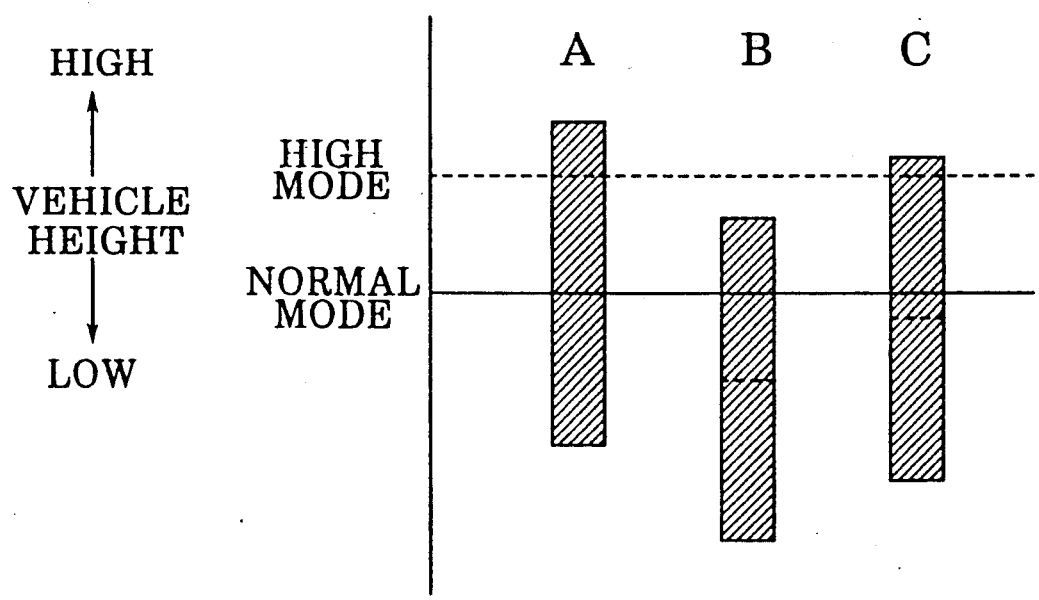
FIG. 14 is a chart for illustrating the operation of the embodiment of the active suspension system.

That is, as shown in FIG. 14, assuming that the system is capable of controlling the vehicle heights within the range denoted with A in the figure under the condition where the loaded weight of the vehicle is a standard weight, e.g. when the number of passengers is two, if the loaded weight is considerably increased, the vehicle height adjusting range will be altered for example to the range B. Accordingly, even though the vehicle height controlling mode Hset is changed to the high mode Hh by the vehicle height setting switch, the vehicle height can not actually be adjusted to the high mode height.

While on the other hand, according to the embodiment, if decisions of YES are made in the steps 440 and 480, the standby pressures Pbi are compensated to increase in the step 490, which will shift the vehicle height adjusting range to the range C, thereby enabling the actual vehicle height to be positively adjusted to the desired height in the high mode in spite of heavier loaded weight.

Although the present invention has been shown and described in detail in terms of particular preferred embodiment, the present invention is not restricted to the embodiment, and it will be seen by those skilled in the relevant art that various modifications may be made without departing from the scope of the present invention.

What is claimed is:

1. A hydraulic active suspension system for a vehicle having a vehicle body and vehicle wheels, comprising:
 a plurality of actuators provided between said vehicle body and said vehicle wheels so as to be able to increase and decrease vehicles heights of said vehicle body relative to said vehicle wheels in accordance with supply and discharge of working fluid to and from working fluid chambers thereof, respectively;
 means for supplying and discharging said working fluid to and from said working fluid chambers;
 means for detecting vehicle heights of said vehicle body relative to said vehicle wheels at locations thereof corresponding to said vehicle wheels; and
 a control means for controlling said working fluid supply and discharge means so that the pressure in said working fluid chamber in each said actuator has a value corresponding to the sum of a pressure determined according to running conditions of said vehicle inducing a force in said vehicle body relative to said vehicle wheels and a pressure determined based upon an integration of the difference between a standard vehicle height and an actual vehicle height;
 wherein said control means limits the value of said integration of the difference in magnitude when the value of said integration of the difference exceeds a predetermined value.

2. A hydraulic active suspension system for a vehicle according to claim 1, wherein said control means calculates a heave component of a displacement of said vehicle body relative to said vehicle wheels from the vehicle heights detected, a difference between an actual heave and a desired heave, and an integration of said difference in heave, and uses the value of said integration of said difference in heave as said value of said integration of the difference between a standard vehicle height and an actual vehicle height.

3. A hydraulic active suspension system for a vehicle according to claim 1, wherein said control means calculates heave, roll and pitch components of a displacement of said vehicle body relative to said vehicle wheels from the vehicle heights detected, a difference between an actual value and a desired value for each mode, and values of integration of said differences in said modes, and wherein said control means controls said working fluid supplying and discharging means so that the pressure in said working fluid chamber in each actuator has a value corresponding to the sum of said pressure determined according to the running conditions of said vehicle and the pressures determined based upon said values of integration of the differences.

4. A hydraulic active suspension system for a vehicle according to claim 3, wherein said control means compensates said values of integration of the differences to reduce them in magnitude when said values of integration are larger in magnitude than respective predetermined values.

5. A hydraulic active suspension system for a vehicle according to claim 1, further comprising a means for setting a desired vehicle height, and said control means further compensates said sum of pressures to increase said sum when the desired vehicle height is increased by said setting means.

* * * * *